(12) United States Patent
Myszak, Jr.

(10) Patent No.: US 7,524,536 B2
(45) Date of Patent: Apr. 28, 2009

(54) SURFACE PROTECTIVE COMPOSITIONS

(75) Inventor: Edward A. Myszak, Jr., West Chester, PA (US)

(73) Assignee: PQ Corporation, Berwyn, PA (US)

( * ) Notice: Subject to any disclaimer, the term of this patent is extended or adjusted under 35 U.S.C. 154(b) by 534 days.

(21) Appl. No.: 11/157,699

(22) Filed: Jun. 21, 2005

(65) Prior Publication Data

US 2006/0286391 A1 Dec. 21, 2006

(51) Int. Cl.
| | |
|---|---|
| B05D 3/00 | (2006.01) |
| B05D 5/08 | (2006.01) |
| C11D 3/02 | (2006.01) |
| C11D 3/08 | (2006.01) |

(52) U.S. Cl. .............. 427/397.8; 427/154; 427/155; 427/156; 427/331; 427/372.2; 427/397.7; 427/402; 427/407.1; 427/409; 427/416; 427/419.1; 427/419.2; 510/405; 510/420; 106/2; 106/14.34; 106/600

(58) Field of Classification Search ............... None
See application file for complete search history.

(56) References Cited

U.S. PATENT DOCUMENTS

| | | | | |
|---|---|---|---|---|
| 3,700,013 | A * | 10/1972 | Coffey et al. ............ | 106/2 |
| 3,899,447 | A * | 8/1975 | McDonald ............... | 510/418 |
| 4,228,048 | A * | 10/1980 | Tesdahl .................. | 524/166 |
| 4,452,731 | A * | 6/1984 | Watanabe et al. ........ | 510/197 |
| 4,457,322 | A * | 7/1984 | Rubin et al. ............ | 134/2 |
| 4,842,763 | A * | 6/1989 | Troger et al. ........... | 134/4 |
| 5,338,528 | A * | 8/1994 | Sorensson et al. ........ | 423/333 |
| 5,344,633 | A * | 9/1994 | Sorensson et al. ........ | 423/333 |
| 5,733,474 | A * | 3/1998 | Kagermeier et al. ..... | 252/186.25 |
| 6,482,445 | B1 * | 11/2002 | Koh et al. ............... | 424/715 |
| 6,579,353 | B1 * | 6/2003 | DeLaMater et al. ..... | 106/14.37 |
| 6,699,827 | B2 * | 3/2004 | Kim ...................... | 510/350 |
| 6,908,636 | B2 * | 6/2005 | Howarth ................ | 426/310 |

OTHER PUBLICATIONS

"Antimicrobial topical rinses," printed Wednesday, Jun. 28, 2006 from http://www.danisco.com/cms/connect/corporate/products+and+services/product+range/antimicrobials/antimicrobial+topical+rinses/antimicrobial_topical_rinses_en.htm © Danisco 2005. All rights reserved.

* cited by examiner

*Primary Examiner*—Vivian Chen
(74) *Attorney, Agent, or Firm*—RatnerPrestia

(57) ABSTRACT

A method of protecting a surface includes applying to the surface a protective composition containing an aqueous wax emulsion. The composition prevents or reduces degradation of the surface of equipment in a facility where the surface is contacted by alkali metal silicate solutions. The compositions are useful, for example, in facilities for treating poultry or other meat carcasses with alkali metal silicates, in facilities for manufacturing detergents, in paper mills, and in any other facility using liquid alkali metal silicate.

17 Claims, No Drawings

SURFACE PROTECTIVE COMPOSITIONS

FIELD OF THE INVENTION

The invention relates to protective coatings. More particularly, it relates to coatings for protection of surfaces against degradation by alkali metal silicate solutions.

BACKGROUND OF THE INVENTION

Alkali metal silicates are used in a variety of commercial and industrial processes and formulations. However, one commonly encountered problem with their use is that they frequently degrade the surface of equipment used in the process. For example, sodium silicates tend to form a water-insoluble scale on the surface of equipment, especially metal equipment. Especially if allowed to dry, the scale (which may include reaction products with carbon dioxide from the air) is typically insoluble in water and very difficult to remove. The scale can affect moving parts, rollers, etc where a smooth surface is desired for aesthetic or other reasons. Even if removal is successful, there may remain an etched, pitted, or roughened appearance that can create the perception of an unclean surface.

Carbon steel and even stainless steel may be degraded in this way, with degradation taking the form of a buildup of water-insoluble scale or other deposit, or a roughening and loss of gloss of the surface, or other type of deterioration. Other surfaces (for example, plastic and rubber) may also be degraded by contact with alkali metal silicates. Such deterioration may be problematic, particularly since some regulatory agencies require that metal surfaces in certain facilities, for example food handling facilities, be cleaned down to bare metal at the end of each day's operation, thus putting a significant burden on the operators. Therefore, methods and compositions for reducing or eliminating scale formation or other surface degradation of equipment contacted with alkali metal silicates would be of value.

SUMMARY OF THE INVENTION

In one aspect, the invention provides a method of reducing scale formation on a surface. The method includes:

a) applying to the surface a protective composition including an aqueous wax emulsion; and b) applying to the surface an alkali metal silicate solution.

In another aspect, the invention provides a piece of equipment including a surface subject to contact by an alkali metal silicate solution, the surface having thereon a layer including a wax.

In yet another aspect, the invention provides a method for protecting a surface during a process using an alkali metal silicate solution. The method includes the steps of:

a) applying to the surface a protective composition including an aqueous wax emulsion, followed by drying the composition on the surface to provide a protective layer thereon;

b) operating the process, thereby contacting the protective layer with the alkali metal silicate solution; and c) after step b), cleaning the surface with a cleaning liquid.

DETAILED DESCRIPTION OF THE INVENTION

Surface Protective Compositions

Protective compositions useful for this invention comprise an aqueous wax emulsion, with the wax being selected from the group consisting of solid vegetable waxes, solid animal waxes, and mineral waxes. Exemplary mineral waxes include paraffin waxes. Typical useful paraffin waxes have a congealing point between 85 and 190° F., and most commonly between 120 and 160° F. Microcrystalline mineral waxes may also be used. The wax may also be a slack wax, i.e., it may contain a lubricating oil. Exemplary vegetable waxes include Japan wax, bayberry wax, carnauba wax, and candelilla wax, and one exemplary animal wax is lanolin.

The surface protective composition may consist essentially of the wax emulsion, or it may also include other ingredients. The aqueous wax emulsion may contain any suitable emulsifier known in the art. Particularly suitable are emulsions using either no emulsifier or an emulsifier approved by the Food and Drug Administration for direct food contact. Suitable emulsions may contain any proportion by weight of the wax, typically greater than 10 wt %.

Use of Surface Protective Compositions

One use of the compositions of this invention is in the commercial handling of poultry, pork, beef, or other whole or cut meat products (including all processed carcasses) for food purposes. Foodborne pathogens pose a significant risk to public health throughout the world, with poultry and pork frequently being implicated in foodborne disease caused by Salmonella and other bacteria. One approach to minimizing bacterial contamination of poultry products includes spraying or dipping of poultry carcasses with alkali metal silicates, which have bactericidal properties. However, the associated equipment typically becomes coated, etched, pitted, or otherwise surface degraded due to contact with the highly alkaline alkali metal silicates, and the surface degradation is frequently very difficult to remove. A similar problem exists in laundry detergent manufacturing facilities, as well as paper mills and any other plant that bottles, packages, sprays, pumps, or applies silicates, where equipment is likewise contacted with the silicates. The value of the protective composition is especially great when the alkali metal silicate has had a chance to dry on the surface, since the dried silicate is often particularly difficult to remove. However, the highly alkaline silicate solution may etch, pit, or otherwise damage surfaces even if it is not allowed to dry, and the present compositions help protect against this degradation as well.

For the above-mentioned (and other) applications, the compositions of this invention provide an easily removable coating which prevents or reduces silicate scale and other marring of metal, plastic, rubber, and other surfaces by alkali metal silicates. As used herein, the term "silicates" includes metasilicates and any other soluble silicate. Usually, the alkali metal silicates will be sodium, potassium, or lithium silicates. The compositions may be applied by any coating means known in the art, such as dipping, brushing, padding, spraying, and rolling. Typically the composition will be sprayed on, and it will usually be allowed to dry before the treated surface is exposed to the alkali metal silicate solution, although this is not required. Application of the composition results in the formation of a protective layer comprising wax. The layer may be continuous, but it need not be. The amount of composition applied and the amount of wax deposited on the surface may vary depending on the type of surface being treated, and need only be sufficient to provide protection from the alkali metal silicate.

Most commonly, especially in facilities such as poultry handling where the equipment is exposed to the alkali metal silicate every day, a surface treatment will be allowed to remain in place for a single day, and then be removed and reapplied. However, the invention is not limited to this timing, and the frequency of application may be higher or lower than this. Often the protection is so effective that a treated surface exposed to repeated cycles of coating, exposure to alkali metal silicate, and washing remains essentially unblemished.

The surface may be cleaned with any cleaning liquid. Typically, the cleaning liquid will be aqueous. It may consist only of water, or water with one or more surfactants in it. The cleaning liquid may be applied at any temperature, but typically it will be at ambient temperature, thus requiring no heating. However, it may be advantageous in some applications for the cleaning liquid to be heated, and this method of cleaning is also contemplated according to the invention. If the liquid is heated, it will typically be to a temperature from about 110° F. to about 160° F., but higher or lower temperatures may be used. The cleaning liquid is typically applied by spraying, although it may be applied by other methods such as scrubbing with an appropriate cloth, brush, or the like. If the liquid is sprayed, it may be at any pressure. Typically, the pressure will be between about 15 and 25 psig, such as typical hose washing, but higher pressures may be used in some applications, for example where the scale or other surface degrading material is particularly tenacious. Such higher pressure application may be above about 100 psig, and more commonly will be above about 1500 psig.

EXAMPLES

Example 1

Grade 318 stainless steel test coupons, available from Danisco USA Inc., New Century, Kans., were dipped into one of three wax emulsions (BW-547A-25, BW-547A-50, and BW-547A-50/152, all available from Blended Waxes, Inc. of Oshkosh, Wis.) and then allowed to dry at room temperature. The BW-547A-25 and BW-547A-50 both used a wax having a congealing point of about 128° F., while the BW-547A-50/152 had a congealing point of about 152° F. The coupons were then dipped into a 5% solution of sodium metasilicate, METSO BEADS 2048, available from PQ Corporation of Philadelphia, Pa., and allowed to dry at room temperature. The coupons were then cleaned by rinsing with water, either hot (120° F.) or cold (50° F.) and either high pressure (1750 psig) or low (20 psig). The gloss of each of the coupons was then subjectively evaluated visually to assess resistance to surface degradation (due to scale formation, etching, and/or pitting) on a scale of 1-10, with 10 indicating no detectable surface degradation. The results are shown in Table 1.

TABLE 1

| Run | Wax Emulsion | Water Temperature | Water Pressure | Gloss |
|---|---|---|---|---|
| 1 | BW-547A-25 | Hot | High | 10 |
| 2 | BW-547A-25 | Hot | Low | 10 |
| 3 | BW-547A-50 | Hot | High | 10 |
| 4 | BW-547A-50/152 | Hot | High | 10 |
| 5 | BW-547A-25 | Cold | High | 10 |
| 6 | None (Control) | Hot | High | 2 |

As can be seen from the results shown in Table 1, coupons treated with the compositions of this invention showed considerably better resistance to surface degradation than the control coupon.

Example 2

An experiment similar to that of Run 1 in Table 1 was performed, in which repeated application (14 times) and washing was performed over a two-week period. Again, the gloss was evaluated at 10, indicating no detectable degradation.

Example 3

A variety of surface protective compositions, and various methods of applying them to stainless steel coupons, was evaluated. In some cases, where indicated, the sodium metasilicate solution was applied by use of a pad, rather than by dipping, to demonstrate that these methods would also be suitable. Retention of gloss was evaluated as noted above, and recorded in Table 2.

TABLE 2

| Run | Wax Emulsion | Wax Application Method | Metasilicate Application Method | Water Temperature | Water Pressure | Gloss |
|---|---|---|---|---|---|---|
| 1 | BW-547A-25 | Paint Sprayer | Dip | Hot | High | 10 |
| 2 | BW-547A-50 | Paint Sprayer | Dip | Hot | High | 10 |
| 3 | BW-547A-50/152 | Paint Sprayer | Dip | Hot | High | 10 |
| 4 | BW-547A-25 | Pan & Roller | Pad | Hot | High | 10 |
| 5 | BW-547A-25 | Brush | Pad | Hot | High | 10 |
| 6 | None (Control) | | Pad | Hot | High | 2 |

Example 4

The applicability of surface protective compositions for use on non-metal surfaces was evaluated generally as described above, with the wax emulsion (if used) being applied by brush, and the metasilicate being applied by pad. The results are shown in Table 3.

TABLE 3

| Run | Wax Emulsion | Substrate | Water Temperature | Water Pressure | Gloss |
|---|---|---|---|---|---|
| 1 | BW-547A-25 | Polyethylene | Cold | High | 10 |
| 2 | None (Control) | Polyethylene | Cold | High | 8-9 |
| 3 | BW-547A-25 | Rubber | Cold | High | 10 |
| 4 | None (Control) | Rubber | Cold | High | 1 |

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of reducing scale formation on a surface, the method comprising:
    a) applying to the surface a protective composition comprising an aqueous wax emulsion;
    b) applying to the surface an alkaline alkali metal silicate solution; and
    c) drying the alkaline alkali metal silicate solution on the surface.
2. The method of claim 1, wherein the surface is in a plant or manufacturing facility and wherein the alkali metal silicate solution comprises sodium silicate.

3. The method of claim 1, wherein the surface is in a facility for treating animal carcasses with the alkali metal silicate solution.

4. The method of claim 3, wherein the animal carcasses are poultry carcasses.

5. The method of claim 1, wherein step a) is performed before step b).

6. The method of claim 1, wherein step a) further comprises drying the protective composition on the surface.

7. The method of claim 1, wherein the wax is a mineral wax.

8. The method of claim 7, wherein the mineral wax is a paraffin wax.

9. The method of claim 7, wherein the mineral wax has a congealing point between 85 and 190° F.

10. The method of claim 7, wherein the mineral wax has a congealing point between 120 and 160° F.

11. The method of claim 1, wherein the surface is a metal surface.

12. The method of claim 1, wherein the surface is a stainless steel surface.

13. A method for protecting a surface during a process using an alkaline alkali metal silicate solution, comprising the steps of:
   a) applying to the surface a protective composition comprising an aqueous wax emulsion, followed by drying the composition on the surface to provide a protective layer thereon;
   b) operating the process, thereby contacting the protective layer with the alkaline alkali metal silicate solution;
   c) drying the alkaline alkali metal silicate solution in place on the protective layer; and
   d) after step c), cleaning the surface with a cleaning liquid.

14. The method of claim 13, wherein step d) is carried out with the cleaning liquid at ambient temperature.

15. The method of claim 13, wherein the cleaning liquid is an aqueous cleaning liquid.

16. The method of claim 15, wherein the cleaning liquid consists of water.

17. The method of claim 15, wherein step d) is carried out with the cleaning liquid at ambient temperature.

* * * * *